INVENTOR.
JOHN DOLZA
BY
Barnard & McGlynn
ATTORNEYS

INVENTOR.
JOHN DOLZA

July 6, 1965 J. DOLZA 3,192,706
SYSTEM FOR REDUCING THE EMISSION OF UNBURNED COMBUSTIBLES
FROM AN INTERNAL COMBUSTION ENGINE
Filed Oct. 26, 1962 3 Sheets-Sheet 3
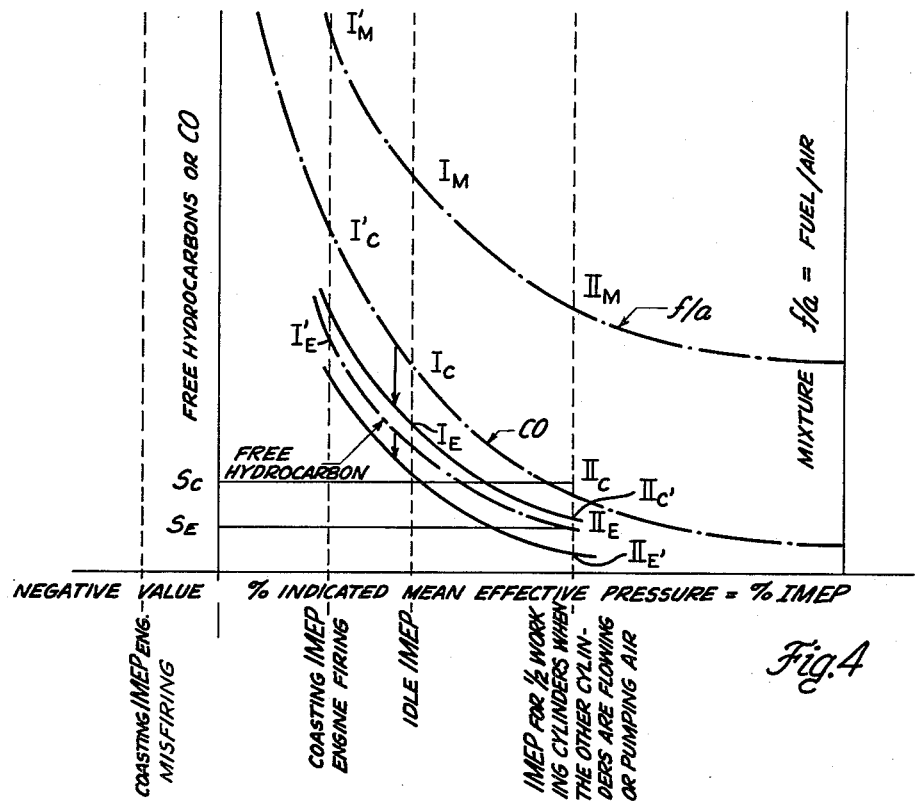
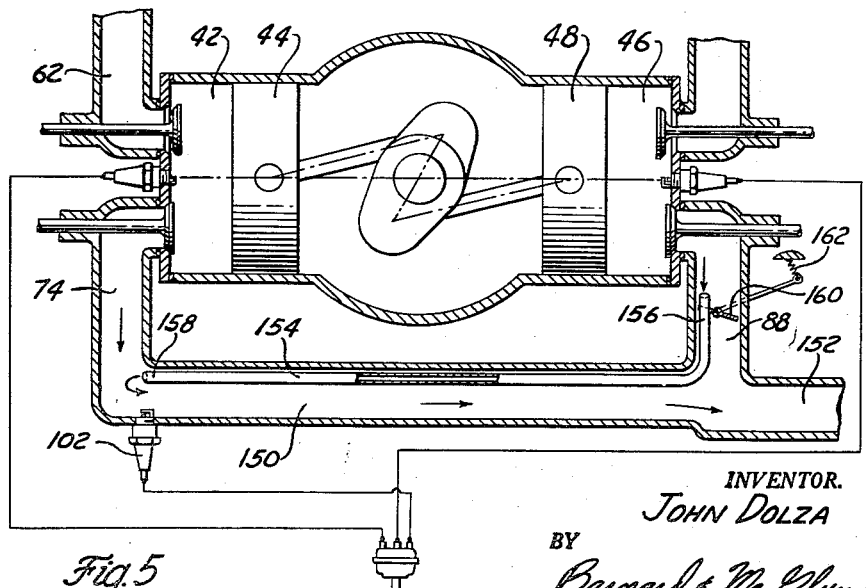
INVENTOR.
JOHN DOLZA
BY
Barnard & McGlynn
ATTORNEYS

3,192,706
SYSTEM FOR REDUCING THE EMISSION OF UN-BURNED COMBUSTIBLES FROM AN INTERNAL COMBUSTION ENGINE
John Dolza, 810 State St., Fenton, Mich.
Filed Oct. 26, 1962, Ser. No. 233,333
14 Claims. (Cl. 60—30)

The present invention relates to a new and improved mechanism for reducing the emission of unburned combustible materials from an internal combustion engine. In addition to reducing vehicle exhaust pollution of the atmosphere, particularly in urban areas, the subject invention also results in improved fuel economy.

It is now known that an internal combustion engine is least efficient and correspondingly discharges into the atmosphere the greatest quantity of pollutants when the engine is operating under conditions of no or low power output. The reason for this wasteful and harmful emission of unburned fuel components is traceable to the fact that each cylinder combustion chamber is functioning so inefficiently as to not properly support combustion at a level compatible with relatively complete combustion of the fuel being supplied to the chamber.

In the present invention, it is recognized that if under coasting, idling, or light load operation only some of the cylinders are kept active to maintain the engine operative while the remainder are inactivated, then more efficient engine operation is realized accompanied by more complete combustion of the fuel and less emission of unburned combustibles to the atmosphere.

To practice the subject invention, it is necessary that the engine be split relative to the supplying of a combustible mixture to the engine's cylinders. More specifically, this is achieved by providing at least two carbureting systems each supplying half of the engine's cylinders. Further, in the present invention means is uniquely provided for rendering inoperative one of the carburetion systems and the associated ignition system for half cylinders under conditions when relatively high power outputs are unnecessary.

The present split engine mechanism includes what may be termed "active" and "inactive" carbureting systems and cylinders. Under normal or high speed operation both the inactive and active carburetion systems are functioning to provide the appropriate fuel-air ratio to each of their cylinder groups. On the other hand, under conditions where split engine operation is both desirable and feasible, only the active carburetion system is operative with its associated cylinders to provide all of the power necessary to keep the engine running. Under these conditions, the remaining or inactive cylinders are merely "floating" in the system neither creating nor absorbing power. In this way the active cylinders are functioning efficiently to consume substantially all of the fuel supplied thereto and, at any rate, emitting unburned combustibles at a level equal to or below the standards set by statute in many states.

In order to reduce the pumping losses which would otherwise obtain in deactivating half of the engine cylinders a unique mechanism is provided for bypassing the "inactive" carburetion system in such a manner that upon the demand for full engine operation, fuel and air flow may be resumed through the inactive carburetion system in a way to smoothly restore normal engine operation.

The details, as well as further objects and advantages, of the present invention will be apparent upon a perusal of the detailed description which follows as well as by reference to the drawings.

In the drawings:

FIGURE 4 is a graph showing the improved results obtained with the modification of FIGURE 5;

FIGURE 5 is a modification embodying an improved arrangement for burning unburned combustibles in the exhaust during split engine operation.

Figure 1:
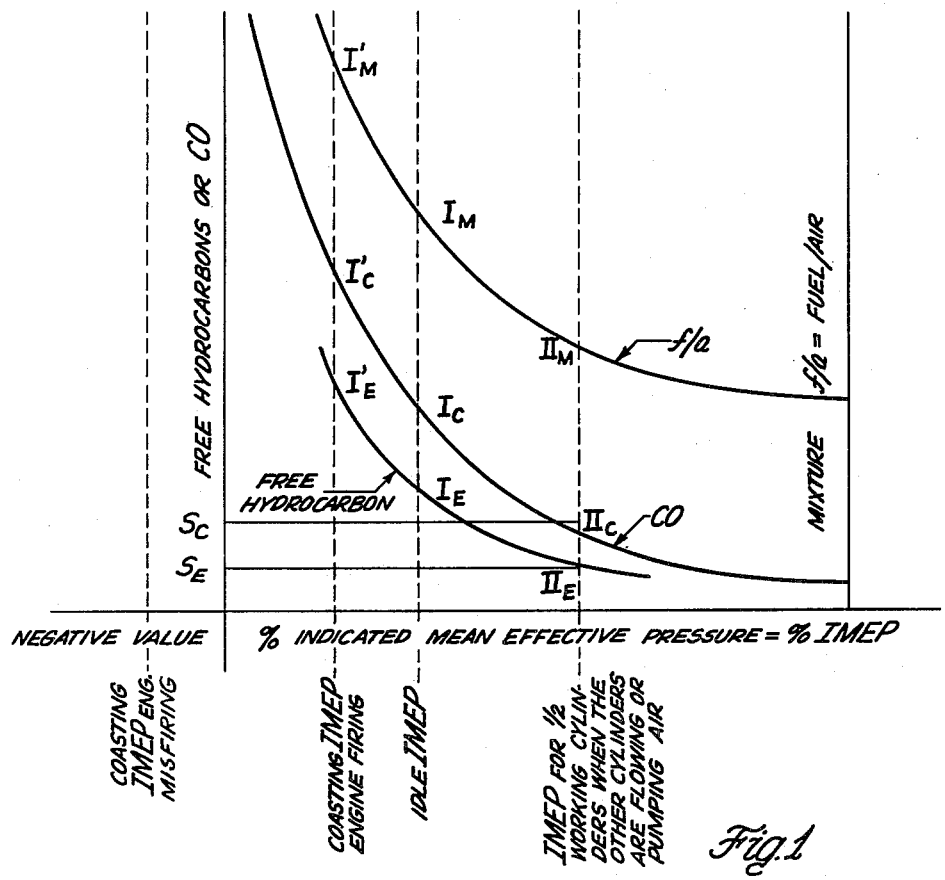
FIGURE 1 is a graphic representation of the emission problem created by inefficient engine operation as well as the improvement effected by the present invention.

It has been observed by test work on automotive-type engines that by increasing the percent of work generated by a cylinder, or the percent of Indicated Mean Effective Pressure (hereinafter called IMEP) from engine idle (or coasting condition) to approximately 30% of wide open throttle, IMEP, the content of CO and hydrocarbons all decrease as may be seen in referring to FIGURE 1.

In fact, while an engine is coasting the IMEP is at its lowest value, being negative when no firing takes place and positive only when intermittent firing occurs. It is to be understood that coasting is the condition in which the engine throttle is closed while the car is traveling with the engine still coupled to the drive shaft and in which condition the momentum of the car keeps the engine running at speeds greater than idle.

When the throttle of an engine is closed immediately after wide open throttle operation, the intake manifold may be coated to a very great extent with liquid gasoline with the manifold walls actually covered with a large number of fuel droplets. The closing of the throttle reduces the amount of air pressure facilitating the evaporation of the liquid fuel and, because of the velocity that the fuel particles have in the direction of the previous air flow in the manifold, some of these drops keep moving into the engine cylinders. The resultant fuel-air mixture flowing into at least some of the cylinders will be too rich to ignite during some of the initial coasting periods. Gradually the mixture will lean down to approximately idle strength $I'_M$, as seen in FIGURE 1. However, firing may still be intermittent since the amount of fuel-air mixture entering a cylinder may be too little due to dilution by the residual exhaust in the combustion chamber to support combustion. This missing or failure of the cylinder to fire will act as a scavenging cycle so that the following suction stroke will add sufficient mixture to the cylinder to permit firing to take place. For this reason, again referring to FIGURE 1, coasting is shown as taking place with: (A) negative torque and negative IMEP and very high hydrocarbons since fuel may not burn when the engine is not firing, and (B) a low positive percent IMEP, usually lower than engine idle because the amount of charge per cylinder may be less than at idle, at the same time, there is high hydrocarbon and CO emission since the fuel-air ratio introduced into the cylinder is richer than stoichiometric (that combination of fuel and air to achieve complete combustion).

At idle, the IMEP is high enough to balance the internal and external frictions of the power plant. If the idle is properly set, firing takes place every time the mixture is ignited at the end of the compression stroke, but combustion is not completed because the mixture necessary for consistent firing is above the stoichiometric value. The result is that CO and hydrocarbons are present in the exhaust of the engine and are thus discharged into the atmosphere in quantities above that deemed to be tolerable particularly in city environments.

Again referring to FIGURE 1, the vertical line marked idle IMEP consequently intersects both the $f/a$ line, free hydrocarbon and CO lines at fairly high points of the curve indicated respectively by $I_E$, $I_C$ and $I_M$.

Figure 2:
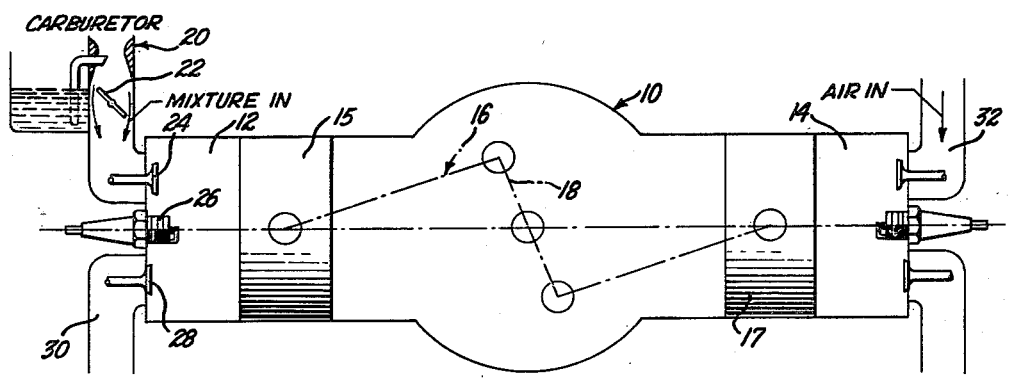
FIGURE 2 is a diagrammatic representation of an internal combustion engine embodying the subject invention.

The next vertical line to the right of "idle" is designated "IMEP of one-half of the cylinders working when the other half are flowing or pumping air." This type of operation is best understood by referring to the schematic representation of FIGURE 2. In this case, an engine is indicated generally at 10 and includes an active cylinder 12 and an inactive cylinder 14 pistons 15 and 17 of which are suitably articulated through a connecting rod system indicated generally at 16 to a common crankshaft 18. Active cylinder 12 is supplied with a fuel-air mixture through a carburetor device indicated generally at 20 which includes a throttle valve 22. The combustible mixture is admitted to the combustion chamber of cylinder 12 through inlet valve 24 where it is ignited by a spark plug 26 after which the combusted materials are exhausted through exhaust valve 28 and exhaust passage 30. Generally the same components are provided for the inactive cylinder 14, however for illustrated purposes, the carburetion mechanism is not shown in intake passage 32 of the inactive cylinder since, in the illustration, the inactive cylinder is simply pumping air.

In the left hand side of the engine, active cylinder piston 15 is pumping a combustible mixture through carburetor 20 whose throttle 22 is set to idle high enough so that it may generate sufficient power to drag the right hand or inactive piston 17 and perform a substantially adiabatic compression in drawing a full charge of air, compressing it and permitting it to expand. Thus the right hand cylinder 14 acts as intermittent energy storing system since during the compression stroke it draws energy from the firing cylinder and returns it during the expansion stroke.

The diagram of FIGURE 1 shows that because of this higher percent IMEP required from the firing cylinders, the $f/a$ point $II_M$, the hydrocarbon point $II_E$ and the CO point $II_C$ are considerably lower than the corresponding values $I_M$, $I_E$ and $I_C$ at engine idling when all of the cylinders are firing.

When an engine idles with some of its cylinders pumping air without the very large depression caused by the throttle associated therewith, it has to overcome considerably less pumping loss. Thus, the amount of work performed by the firing cylinders to keep the engine idling is less than when all of the cylinders are firing at idle. When half the cylinders are firing they work at higher thermal and combustion efficiencies which increases engine economy and drastically reduces the emission of unburned hydrocarbons and CO. In other words, the net result is that an engine idling on half of the cylinders and pumping unrestricted air with the remaining cylinders uses considerably less fuel than the engine idling by firing all cylinders.

If we use the following symbols:

$W_{1/2}$ = weight of air consumed by the firing cylinders when engine is idling with ½ of the cylinders $W_A$ = weight of air consumed by the engine when idling by firing all cylinders $$W_{1/2} < W_A$$

$\dfrac{W_{1/2}}{W_A}$ is approximately equal to .7

Consequently the ratio:

(A) $\dfrac{II_E \times W_{1/2}}{I_E \times W_A} < \dfrac{II_E}{I_E}$ and (B) $\dfrac{II_C W_{1/2}}{I_C W_A} < \dfrac{II_C}{I_C}$ Since:

$II_E \times W_{1/2}$ is the weight of hydrocarbon with ½ of cylinders firing and ½ cylinders pumping
$II_C \times W_{1/2}$ weight of CO with half of cylinders firing and half of cylinders pumping
$I_E \times W_A$ weight of hydrocarbons on conventional idle
$I_C \times W_A$ weight of CO on conventional idle Equations A and B state that the overall weight of hydrocarbons and CO exhausted by an engine with only ½ of its cylinders firing at idle or off idle, is less than the reduction one would expect from the percent of hydrocarbon and CO in the exhaust of the operaitng portion of the engine.

In FIGURE 1, the percent of CO presently allowed by those cities or states having antipollution laws is indicated with $S_C$ and a horizontal line at that value shows that a conventional engine when coasting generates a percent of CO indicated by $I'_C$ and at idle a percent indicated by $I_C$ where $$I'_C > I_C > S_C$$

Similarly the percent of hydrocarbons coasting $I'_E$ and idling $I_E$ are related to the amount $S_E$ allowed by statute by the expression $$I'_E > I_E > S_E$$

Test results show that the percent of hydrocarbons $II_E$ at the exhaust of the operating half of the engine can be controlled to approximately the permissible value $S_E$. Furthermore, the percent of CO indicated by $II_C$ is less than $S_C$. Consequently, by idling an engine with ½ of the cylinders firing and ½ of the cylinders pumping unrestricted air, it is possible to reduce the percent of CO and hydrocarbons to acceptable values as set by the existing laws, e.g. Los Angeles, on automotive exhaust pollution control and to reduce the weight of pollutant exhausted per hour $W_{1/2} \times II_E$ and $W_{1/2} \times II_C$ below the corresponding values $W_A \times S_E$ and $W_A \times S_C$ of an engine firing at all cylinders and having the allowed percent of hydrocarbons $S_E$ and carbon monoxide $S_C$.

The engine operation with ½ of the cylinders may be continued until the remaining cylinders must be activated to achieve power in excess of that generatable with split engine operation.

Figure 3:
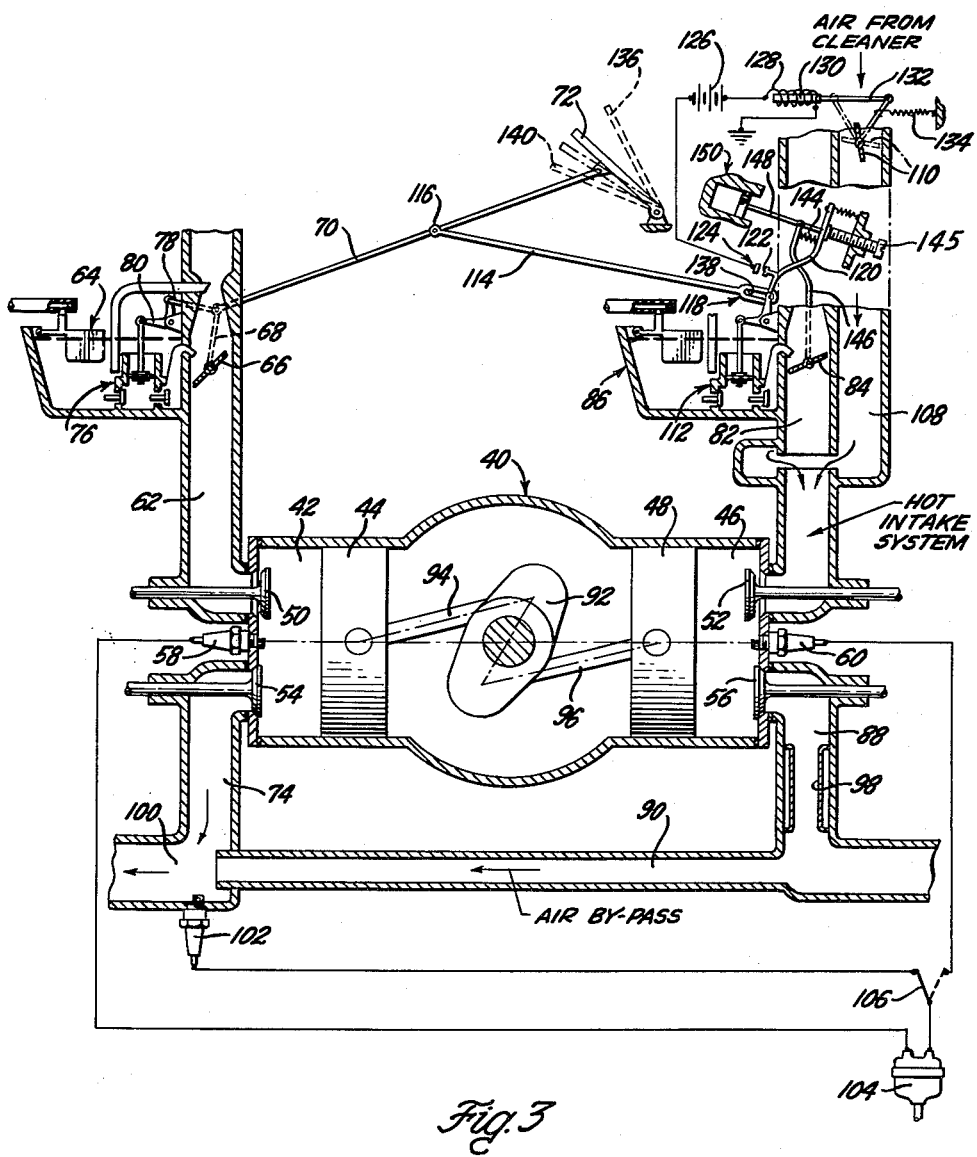
FIGURE 3 is a more complete diagrammatic engine fuel control system embodying the subject invention.

Referring now to FIGURE 3 of the drawings, a description will be undertaken of an engine charge forming system which permit increased fuel economy as well as contributing to a substantial reduction of unburned hydrocarbons and CO. In this case, an engine is shown generally at 40 and includes "active" cylinders 42 having pistons 44 slidably disposed therein and "inactive" cylinders 46 having pistons 48 slidably disposed therein. It is to be understood that all cylinders are operative to produce power under normal and high power operating conditions and that the right hand or inactive cylinders 46 are inoperative only under coasting or near idling conditions. All of the cylinders include intake and exhaust valves 50, 52 and 54, 56 as well as spark plugs 58 and 60. Each active cylinder 42 includes an induction passage 62 and a common carburetor device 64 associated therewith. Device 64 includes a throttle valve 66 for controlling the quantity of combustible mixture flow through passage 62. Throttle 66 is articulated through lever 68 and link 70 to an accelerator pedal 72. A conventional accelerator pump 76 is also adapted to be operated by pedal 72 through link 70 and levers 78 and 80.

Exhaust gas from cylinder 42 is discharged through passage 74.

Each inactive cylinder 46 includes an induction passage 82 flow through which is controlled by a throttle valve 84 of a carbureting device indicated generally at 86. The inactive cylinders are exhausted through a passage 88 which is adapted to communicate with active cylinder exhaust passage 74 through a bypass passage 90.

Under normal or high power operating conditions, all cylinders are operative to supply power to the common crankshaft 92 to which the pistons 44 and 48 are articulated through rods 94 and 96 respectively.

The mechanism will now be described which permits split engine operation, e.g. half cylinders firing with the other half merely pumping air. It was earlier pointed out that during deceleration, the fuel-air ratio may be too rich to burn in the cylinders or may be contaminated with too much residual exhaust to support combustion. In the case of a too rich combustible mixture, by bleeding air exhausted by the pumping or inactive cylinders 46 into the exhaust system of the firing cylinders, a combustible mixture is achieved. For this purpose, air from pumping cylinders 46 passes through the hot exhaust manifold 88 which includes a heat storing device 98. Thus the air is preheated prior to flowing through bypass 90 and mixing with the partially burned exhaust gas from passage 88 in exhaust combustion space 100.

Immediately after deceleration is initiated by closing the throttle, the intake manifold walls are covered with liquid fuel which normally is simply pumped to the atmosphere without being burned. In the present system, this residual fuel is mixed with air from passage 90 and the combustible mixture in space 100 is ignited by a spark plug 102 which is adapted to be energized by distributor 104 through a switch member 106 which interrupts current to the inactive spark plugs 60 when the vehicle is coasting. Thus distributor 104 will cause spark plug 102 to fire periodically and ignite the combustible mixture in space 100 consuming the heretofore unburned combustibles.

After the mixture in the manifold returns to normal, because of the elimination of excess fuel, only a limited amount of oxidation of exhaust may be required and this may be achieved by the incoming air from bypass 90.

Since only one-half of the cylinders are operative under coasting or idling conditions, the resulting manifold depression during deceleration can be kept low enough (high enough absolute pressure) to permit complete combustion or sufficiently good combustion to take place without generation of excessive power that would interfere with car braking. This condition is not practical on engines firing on all cylinders during deceleration since keeping manifold depression high enough to insure combustion results in the generation of sufficient engine power to seriously interfere with car barking.

In order to maintain the inactive cylinders in a non-power producing condition and also to prevent fuel from being drawn therethrough, a unique throttle and air flow control system has been devised. As seen in FIGURE 3, a second induction or air bypass passage 108 is provided and is adapted to receive air from the air cleaner and discharge the same into induction passage 82 posteriorly of throttle valve 86. Flow through bypass passage 108 is controlled by a throttle valve 110 which is either fully opened or closed depending on whether the engine is idling (or coasting) as opposed to operating under normal or high power engine operation.

Assuming a normally carbureted engine, the portion of the engine pumping air is the right hand side, as viewed in FIGURE 3, in which case carburetor throttle 84 is closed and air bypass throttle 110 is open.

After throttle 66 of the active cylinders 42 has opened to a predetermined amount, or after the engine has achieved a given manifold depression, and the driver depresses accelerator pedal 72 further, the following events are made to occur in the following order: (1) bypass 108 is closed by closing throttle 110, (2) accelerating pump 112 squirts fuel above closed throttle 84, and (3) throttle 84 opens in proportion to the position of the accelerator pedal but not in excess of the amount which will permit the fuel-air mixture at the intake valve to be combustible.

The above sequence is explained as follows. For a given manifold depression, the mass air flow through an induction passage is approximately equal to air density times volumetric efficiency times engine angular speed almost at the instant the throttle opens. Being heavier, the fuel acquires velocities much lower than the air, thus some engine revolutions may take place during throttle opening, or immediately afterwards, in which the air does not carry adequate fuel for combustion in the cylinders. Consequently, it is necessary that the accelerating pump delivers the fuel before the air is admitted into the manifold so that the slower traveling fuel may reach intake valve 52 and enter the cylinder at the time the corresponding quantity of air reaches this point.

This synchronization of fuel and air flow can be facilitated if the fuel from the accelerating pump is dumped, for example, upon throttle valve 84 at the lower edge thereof during the initial opening and immediately after closing the bypass air valve or throttle 110.

The large pressure differential between the atmospheric condition ahead of throttle 84 and manifold depression past it will atomize and impart very high velocity to the fuel droplets thus facilitating its movement by the incoming air. This phenomenon may be further enhanced by designing a streamlined manifold thus reducing the condensation of fuel upon the manifold walls.

The mechanism for interrelating the actuation of throttle 84 and bypass throttle 110 will now be considered in detail. A throttle link 114 is articulated at 116 to active throttle control link 70. The other end of link 114 is connected through a lost motion connection 118 to accelerating pump actuating lever 120. Accelerating pump lever 120 also includes a movable contact element 122 of a switch 124 which controls the flow of current from source 126 to a solenoid 128 which, in turn, controls the movement of an armature 130. Armature 130 is articulated through a link 132 to bypass throttle 110. When solenoid 128 is de-energized, spring 134 maintains bypass throttle 110 in a wide open position as shown in FIGURE 3.

As accelerator pedal 72 is moved from its idle position 136 to the full line position shown, only the left hand or active throttle 66 opens since lost motion connection 118 precludes any actuation of throttle 110 until the slot 138 has moved to its leftmost position. Further opening movement of accelerator pedal 72 will initiate movement of accelerator pump lever 120 thus closing switch 124, energizing solenoid 128 and moving bypass throttle 110 to a fully closed position. It is important that the closing of bypass valve or throttle 110 and the stopping of bypass air flow around carburetor 86 take place substantially before accelerating pump 112 delivers its fuel.

Still further opening movement of accelerator pedal 72 from the full line position to 140 will continue to open active throttle 66 and actuate its accelerating pump 76. This movement also actuates accelerator pump 112 which delivers fuel on top of throttle 84. This fuel will be drawn past the edge of the throttle into the local high speed air stream between the throttle edge and induction passage wall. This fuel is allowed to travel almost to intake valve 52 before throttle 84 is opened.

The delayed air flow is achieved as follows. While the movement of accelerator pedal 72 is actuating pump 112 through lever 122, the upper end of this lever compresses a preloaded spring 144 which biases against throttle lever 146. Throttle lever 146 and pump lever 120 are thus relatively movable and the former is connected through a rod 148 to a dashpot device 150. Opening movement of lever 120 is resiliently transmitted to lever 146 through spring 144. Thus the dashpot 150 and spring 144 combined to retard opening of throttle 84 and, hence, causing a retardation of air flow past throttle 84 substantially equivalent to the time required by the fuel to reach the intake valve.

Adjustment of the force of spring 144 and, therefore, the opening of throttle 84 may be varied through an adjustable stop screw 146.

Thus it will be seen the present invention uniquely provides means operative during coasting conditions to first consume or burn combustible materials extant in the manifold after which the engine is made to function in a manner in which unburned hydrocarbons and CO are maintained at a level compatible with good fuel economy as well as with reasonable standards of health.

While the system as thus far described results in considerable improvement in terms of reducing the emission of unburned hydrocarbons and CO to levels which will satisfy the laws in those states having passed upon this matter, a further modification of the basic system results in still further improvements in this emission condition. Reference is now made to FIGURE 5 and the graph shown in FIGURE 4 the latter which shows the added improvements achieved by this modification.

The basic system of FIGURE 5 is the same as that of FIGURE 3, therefore, only the lower half of the system is shown in FIGURE 5 to represent the instant modification. In all other respects like numerals are used to represent the same elements as shown in FIGURE 3 and it is to be understood that the remainder of the system is identical therewith.

In the earlier modification of FIGURE 3, an additional air bypass passage 90 is added to the exhaust system in order to convey heated air from the inactive cylinders to exhaust chamber 100 for combustion with the exhaust gases issuing from the active cylinders 42. With this arrangement, it is necessary to insulate air bypass passage 90 and, notwithstanding this precaution, considerable heat losses are experienced in the transmission of the air to chamber 100. As a consequence, the combustion which takes place in chamber 100 is less complete than desired since the air supplied to the exhaust gases is at a lower temperature, e.g. 900° F., than is now found to be possible with the modification of FIGURE 5.

In the modification of FIGURE 5, instead of adding a separate air bypass passage to connect the two exhaust systems, as is done in the earlier modification, the normal and otherwise available exhaust cross-over passage 150 is utilized to house the means for conveying of air to further oxidize the exhaust gases from the active cylinders 42. In the normal engine of the type in which the subject system is to be employed, the exhaust gases from one bank of cylinders 42 are conveyed through exhaust cross-over passage 150 to a common exhaust pipe 152 which is also fed by the other cylinder bank. Since this exhaust cross-over passage is already available, no additional structure is provided up to this point. Instead, a relatively small, heat resistant tube 154, e.g. stainless steel, is mounted within exhaust cross-over passage 150 and includes one end 156 which extends upwardly within exhaust passage 88 of the inactive cylinders and terminates at the other end 158 proximate spark plug 102 disposed at the juncture of exhaust passage 74 from the active cylinders and cross-over passage 150.

As a result of this arrangement, when split engine operation is occurring and the inactive cylinders are merely pumping air, the hot exhaust gases from the active cylinders are flowing through exhaust cross-over passage 150 to common exhaust pipe 152. At the same time, a limited quantity of air from the inactive cylinders 46 is counterflowing through pipe or tube 154. This air is thereby being progressively preheated by the exhaust gases until it is discharged at the hottest end of the cross-over passage proximate spark plug 102.

In this way, the preheated air is mixed with the exhaust gases at a considerably higher temperature, e.g. 1200° F., than in the first modification and as a result more efficient combustion takes place and the quantity of CO and unburned hydrocarbons is still further reduced to the levels indicated on the dash curves of FIGURE 4. It will now be seen, in referring to FIGURE 4, that with one-half of the engine's cylinders working, the unburned hydrocarbons now being emitted are represented by $II_E'$ and the CO by $II_C'$. The added improvement in the emission of unburned combustibles is readily apparent from the graph and both the CO and unburned hydrocarbons are now well below the values $S_C$ and $S_E$ typically required by statute.

The arrangement of tube 154 within exhaust cross-over passage 150 results in a counter-flow situation in which the air is flowing in the opposite direction to the exhaust gases in such a way that the air is discharged into the afterburning combustion zone at essentially the highest temperature possible.

To be sure of an adequate flow of fresh or afterburner air through pipe 154, an air flow responsive or unbalanced valve 160 is mounted in exhaust passage 88 of the inactive cylinders 46. Valve 160 is biased in a closing direction through a spring member 162. Valve 160 is suitably slotted to permit pipe 154 to extend therethrough and to terminate immediately anteriorly of the closed valve. Spring 162 is calibrated in such a way that when all of the cylinders are operative to supply power, the flow of exhaust gas through passage 88 will create a sufficient pressure drop across the valve to maintain the same in an open condition against the force of the spring. However, during idling or coasting conditions flow through passage 88 is insufficient to overcome spring 162, consequently, valve 160 will be maintained closed. By thus closing passage 88 sufficient air pressure is maintained anteriorly thereof to insure adequate air flow through pipe 154.

Spark plug 102 is energized in the same manner as already described with respect to the modification of FIGURE 3 and will ignite the unburned combustibles flowing from passage 74 when combined with the relatively fresh high temperature air issuing from pipe 154.

It is apparent that various modifications may be made in the illustrated embodiments of the present invention within the intended scope of the invention as set forth in the hereinafter appended claims.

I claim:

1. A charge forming device for an internal combustion engine comprising a first group of cylinders and a second group of cylinders, induction passage means communicating with said first group of cylinders, first carburetor means coacting with said induction passage for providing a combustible mixture to said first group of cylinders, said first carburetor means including a throttle valve, an accelerator pedal, linkage means for articulating said accelerator pedal and throttle valve, a second induction passage communicating with said second group of cylinders, second carburetor means coacting with said second induction passage for supplying a combustible mixture to said second group of cylinders, a throttle valve for controlling the quantity of flow through said second induction passage means, a second linkage device for operatively connecting said accelerator pedal and said second throttle, said second linkage device including a lost motion arrangement whereby initial opening movement of said accelerator pedal will open said first throttle while the second throttle remains closed, an air passage connected in parallel to a portion of said second induction passage and adapted to bypass air around said second throttle, a third throttle valve in said bypass passage, said third throttle valve normally biased in an open position to permit air flow through said bypass passage when said second throttle is closed, means responsive to the opening movement of said second linkage device for closing said third throttle just prior to opening of said second throttle, means for providing an electric spark to all of said cylinders, and means operable when said third throttle is in its open position to interrupt the flow of current to the spark providing means associated with said second group of cylinders.

2. A charge forming device as set forth in claim 1 in which said second carburetor means includes an accelerator pump, said pump being operable by the lost motion arrangement to admit fuel to the second induction passage immediately anterior of the associated throttle just prior to the opening of the latter.

3. A charge forming device as set forth in claim 1 in which said second linkage device includes first and second lever members, said first lever being connected to the accelerator pedal through the lost motion arrangement, and a spring member for resiliently connecting said first and second lever members, said second lever being directly connected to said second throttle.

4. A charge forming device as set forth in claim 3 which includes a dashpot device, said second lever also being connected to said dashpot device to delay the opening movement of said second throttle after said first lever is actuated.

5. A charge forming device as set forth in claim 3 which includes a solenoid device operable when energized to close said third throttle, a switch including a movable contact fixed to said first lever, said contact being adapted to close said switch and energize the solenoid during the initial movement of said first lever whereby the third throttle will be closed prior to the opening of the second throttle.

6. A charge forming device as set forth in claim 3 which includes means for injecting a limited quantity of fuel into the second induction passage during the interval between the closing of the third and opening of the second throttles.

7. A charge forming device as set forth in claim 6 in which the fuel injecting means comprises a pump adapted to discharge into the second induction passage immediately anterior to the lower edge of the second throttle.

8. A charge forming device for an internal combustion engine including a first group of cylinders, a second group of cylinders, each of said cylinders including a piston member slidably disposed therein and articulated through a rod element to a common crankshaft, a first carburetion system for supplying a combustible mixture to said first group of cylinders, a second carburetion system for supplying a combustible mixture to said second group of cylinders, each of said carburetion systems including a throttle valve for controlling the quantity of combustible mixture flow therethrough, a common accelerator pedal suitably articulated to each of said throttle valves, a lost motion device, said accelerator pedal being articulated to said second carburetion system throttle through said lost motion device such that initial opening movement of said pedal will impart an opening movement only to said first system throttle while the second system throttle remains in a closed position, an air passage for bypassing air around said second system throttle, a valve member in said bypass passage permitting air to flow through said bypass passage when said second system throttle is closed and to block air flow through said passage when said second system throttle is about to open, means for providing an electric spark to all of said cylinders to ignite the combustible charge therein, means for interrupting the spark to the second group of cylinders when said bypass passage valve is open and said second system throttle is closed whereby the power output from the engine is maintained by said first group of cylinders while said inactive cylinders merely pump air, passage means associated with said first group of cylinders and adapted to discharge the exhaust gases therefrom to a chamber, a second air bypass passage communicating said second group of cylinders with said chamber whereby fuel free air is supplied to the exhaust gases from said first group of cylinders to oxidize unburned combustibles contained therein.

9. A charge forming device as set forth in claim 8 which includes an electric spark device disposed in said exhaust gas chamber, said spark device being operative to ignite the combustibles in said chamber only when the spark is interrupted to the second group of cylinders.

10. A charge forming device as set forth in claim 9 which includes an exhaust cross-over passage leading from said chamber to a common exhaust passage, said second air bypass passage comprising a pipe disposed within the cross-over passage, said pipe including one end terminating proximate the spark device disposed in said exhaust gas chamber for providing preheated air to facilitate further combustion of said exhaust gases.

11. A charge forming device as set forth in claim 10 which includes valve means disposed in said second air bypass passage, said pipe including another end in said second air bypass passage terminating immediately anteriorly of said valve means, said valve means being adapted to close when said second system throttle is closed to insure adequate air flow through said pipe.

12. A charge forming device as set forth in claim 11 in which said valve means includes an unbalanced valve member, a spring element biasing said valve member in a closed position, said valve member being adapted to open against the force of the spring element when the pressure drop across the member exceeds a predetermined value.

13. A split engine system of the type including a first carburetion device for supplying a combustible mixture to one-half the engine cylinders under all engine operating conditions and a second carburetion device for supplying a combustible mixture to the other half of the cylinders under normal or high power operating conditions, said second carburetion device being inoperative to supply a combustible mixture under coasting or idling conditions, in which an air passage is adapted to bypass air around the second carburetion device and to supply such air to said other half of the cylinders when the latter device is rendered inoperative to supply a combustible mixture, a common exhaust passage for receiving the exhaust gases from all of the engine cylinders, an exhaust cross-over passage for conveying the exhaust gases from the continuously operating cylinders to the common exhaust passage, a pipe disposed within said cross-over passage and communicating at one end with the air bypass passage, the other end of said pipe terminating proximate the inlet of the cross-over passage permitting air preheated substantially to the temperature of the exhaust gas entering the cross-over passage to mix with and oxidize a large portion of the unburned combustibles contained in said exhaust gas.

14. A split engine system as set forth in claim 13 in which valve means is provided in the air bypass passage immediately posteriorly of said one end of said pipe, said valve means closing under said coasting or idling conditions to insure adequate air flow through said pipe.

References Cited by the Examiner

UNITED STATES PATENTS

| 1,956,657 | 5/34 | Scheel. | |
| 2,085,818 | 7/37 | Messinger. | |
| 2,114,655 | 4/38 | Leibing. | |
| 2,420,925 | 5/47 | Wirth | 123—127 |
| 2,937,490 | 5/60 | Calvert | 60—30 |

JULIUS E. WEST, *Primary Examiner.*